UNITED STATES PATENT OFFICE.

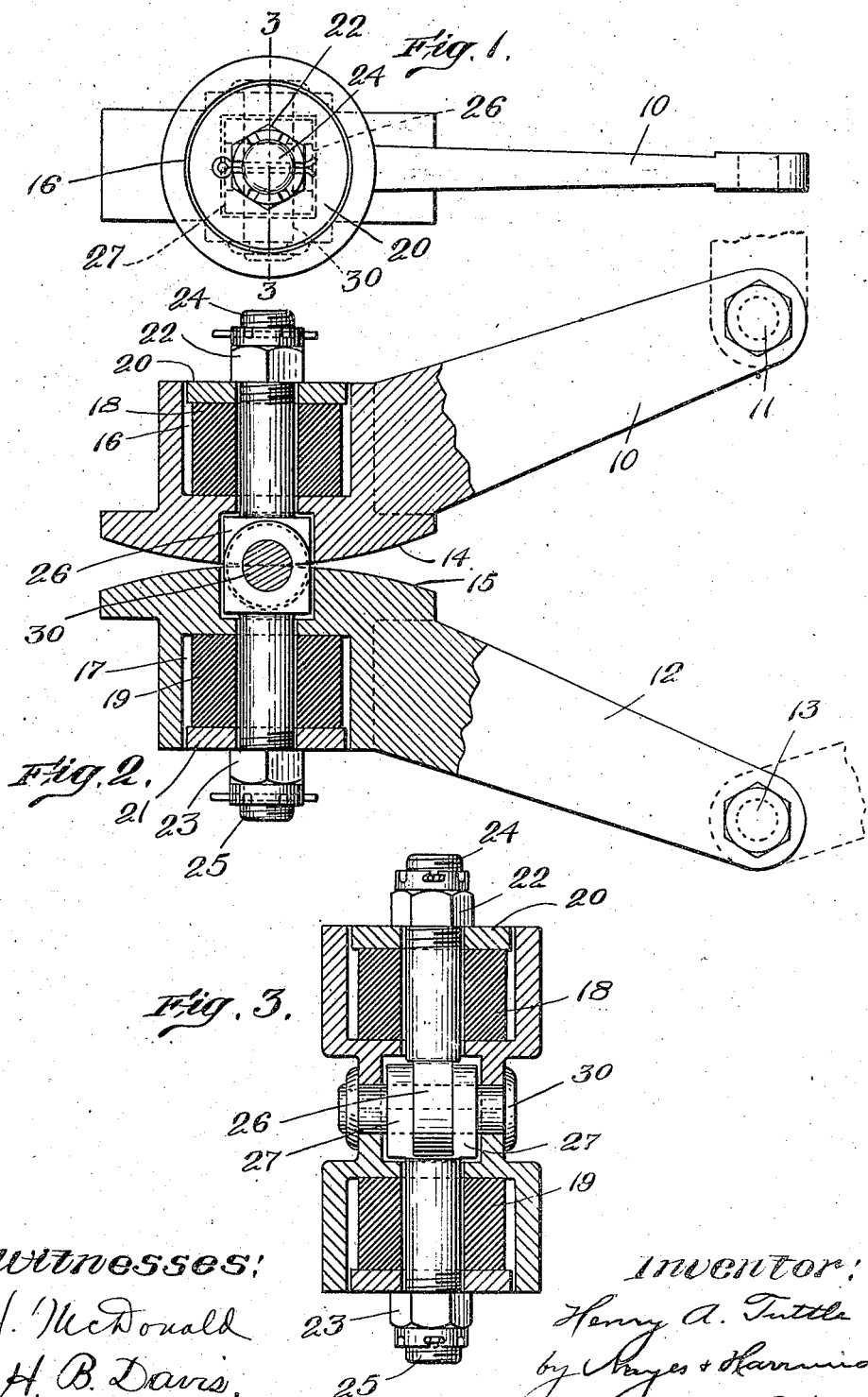

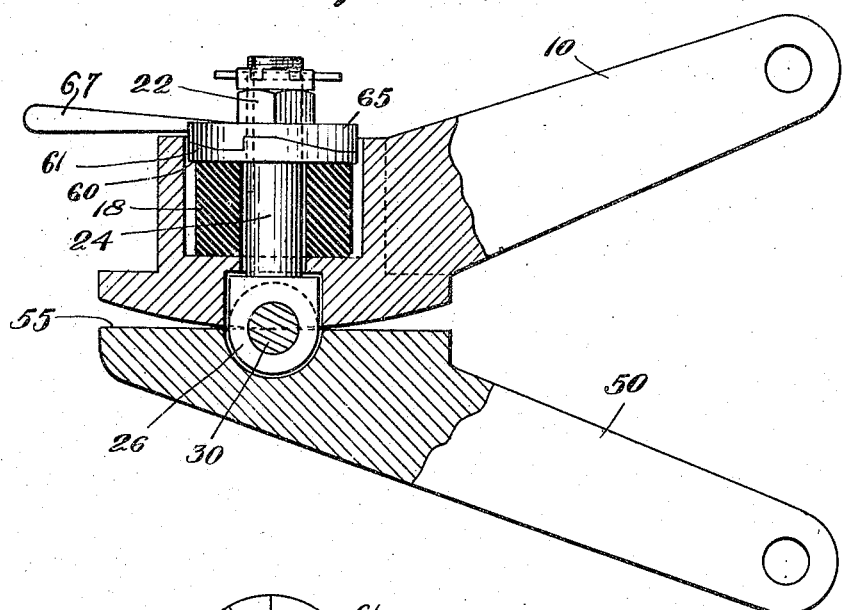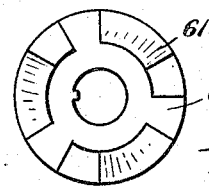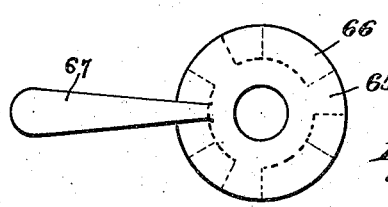

HENRY A. TUTTLE, OF TAUNTON, MASSACHUSETTS.

SHOCK-ABSORBER.

1,073,187.

Specification of Letters Patent. Patented Sept. 16, 1913.

Application filed October 2, 1912. Serial No. 723,459.

*To all whom it may concern:*

Be it known that I, HENRY A. TUTTLE, a citizen of the United States, residing at Taunton, in the county of Bristol, in the State of Massachusetts, have invented an Improvement in Shock-Absorbers, of which the following is a specification.

This invention relates to shock-absorbers for automobiles and the like adapted for connection between the frame and the axle or other moving parts of an automobile, to resist movements of the frame and axle, both toward and from each other.

The invention has for its object the provision of one or more springs or cushions and improved means for supporting them and for compressing each spring upon relative movements of the frame and axle both toward and from each other.

Figure 1 is a plan view of a shock-absorber embodying this invention. Fig. 2 is a side elevation and partial vertical section of the shock-absorber shown in Fig. 1. Fig. 3 is a transverse vertical section of the shock-absorber shown in Fig. 1, taken on the dotted line 3—3. Fig. 4 is a side elevation and partial vertical section of a modified form of shock-absorber. Figs. 5 and 6 are plan views of means for adjusting the spring.

10 and 12 represent, respectively, two diverging arms having holes at their outer ends to receive bolts 11 and 13 for connecting said arms, respectively, with the frame and axle or other parts of the running gear of an automobile or other vehicle. The inner ends of said arms have curved faces 14, 15, for engagement with each other, which permit a rocking movement of the arms as the frame and axle approach and recede from each other. The curved engaging-faces may be arcs of circles or may be cams. Said arms are held against longitudinal and transverse movement with respect to each other yet are permitted to rock, and said rocking movement, in both directions, is resisted by springs. As shown in Figs. 1 to 3, the inner end of the arm 10 has a recess 16 in its upper side, above or opposite its curved engaging-face 14, which receives a spring 18, consisting of a block of rubber, but in lieu thereof any suitable form of spring may be employed. A plate 20 is held against the outer end of said spring, at the entrance to the recess, by a nut 22, arranged on the screw-threaded shank-portion 24 of a bolt, which latter extends through a center-hole in the plate 20, and through a center-hole in the spring 18, and through a hole in the arm, and the head 26 of said bolt is arranged in a recess formed in the engaging-face 14. Said head 26 is made as an ear for pivotal connection with other ears, and extends beyond the engaging-face, and, as here shown, has right-angularly formed shoulders. The inner end of the arm 12 has a recess 17 in its under side below or opposite its curved engaging-face 15, which receives a spring 19, consisting of a block of rubber, or, in lieu thereof any suitable form of spring may be employed. A plate 21 is held against the outer end of said spring, at the entrance to the recess, by a nut 23 arranged on the screw-threaded shank-portion 25 of a bolt, which latter extends through a center-hole in the plate 21, and through a center-hole in the spring 19, and through a hole in the arm, and the head 27 of said bolt is arranged in a recess formed in the engaging-face 15. Said head 27 is composed of a pair of ears which extend beyond the engaging-face, and which receive between them the ear 26, for pivotal connection therewith, and, as here shown, said head or the base of the ears composing it have right-angularly formed shoulders.

30 represents a pivot-pin which extends transversely through holes in the ears 26 and 27. Said pivot-pin is arranged at the normal point of contact of the two engaging-faces, intersecting said point; and hence maintains its position as the arm rocks, and furthermore, said pivot-pin has enlarged end portions or heads, see Fig. 3, which extend over the outer sides of both arms, at the sides of the engaging-faces. By means of these pivotally connected bolts the arms are connected together and held against longitudinal and transverse movement with respect to each other, yet permitted to rock, and by means of the springs said rocking movement is resisted in both directions, for it will be observed that as the arms approach each other and rock on their engaging-faces in one direction both springs will be compressed, and as the arms recede from each other and rock on their engaging-faces in the other direction both springs will be compressed. The compression of the springs upon both movements of the arms is due to the fact that each spring is connected with the arm other than the one which bears it.

The recesses 16 and 17 are made a little larger in diameter than the springs or cushions 18 and 19, and when said springs or cushions are compressed and thereby caused to expand laterally the walls of the recesses serve to limit such expansion, so that they are supported by said walls against undue distortion, yet even when in engagement with said walls they may be still further compressed to a slight extent.

Referring to Fig. 4, the arm 10 is made like the arm 10 of Fig. 2, and has a spring 18 above its curved engaging-face, and a bolt 24 extends through said spring having as its head an ear 26 which occupies a position between two ears arranged directly on the inner end portion of the arm 50, and said arm 50 has a straight engaging-face 55 upon which the inner end portion of the arm 10 rocks. In this instance, but one spring is employed, and this spring is compressed upon both rocking movements of the arms owing to the fact that it is borne by one arm above and intermediate the length of its engaging-face and is connected with the other arm.

Referring to Figs. 5 and 6, 60 represents a circular plate designed to be placed on top of the spring 18, and having projections on its upper side with inclined faces, and 65 represents a circular plate designed to be placed on top of the plate 60 having projections 66 on its under side with inclined faces for coöperation with the projections 61, and said plate 65 has a hand-piece 67 by which it may be turned. The bolt 24 extends through center holes in said plates 60 and 65. By turning the plate 65 the projections thereon ride up on the projections on the plate beneath it and thereby adjust the tension of the spring 18.

I claim:—

1. A shock-absorber consisting of a pair of diverging arms adapted for connection respectively with a frame and axle of an automobile and having engaging-faces for engagement with each other which permit of a rocking movement of the arms, a spring supported by one of the arms above said engaging-faces, arranged for compression upon rocking movements of the arms in both directions, a bolt extended through said spring and arm, having a head arranged in a recess in the engaging-face of the arm, said head having a perforated ear and a pivot-pin extended transversely through means connected with the other arm and through the perforation in said ear, said pivot-pin intersecting the normal point of contact of the engaging-faces of the arms, thereby to maintain its position as the arms rock, substantially as described.

2. A shock-absorber consisting of a pair of diverging arms adapted for connection respectively with a frame and axle of an automobile and having engaging-faces for engagement with each other which permit of a rocking movement of the arms, a spring supported by one of the arms above said engaging-faces adapted to be compressed upon rocking movements of the arms in both directions, a bolt extended through said spring and arm, having a head arranged in a recess in the engaging-face of the arm, said head having a perforated ear and a pivot-pin extended transversely through means connected with the other arm and through the perforation in said ear, having enlarged end portions which extend over the outer sides of both arms at the sides of the engaging-faces, substantially as described.

3. A shock-absorber consisting of a pair of diverging arms adapted for connection respectively with the frame and axle of an automobile and having engaging-faces for engagement with each other which permit a rocking movement of the arms, a recess formed in the inner end of one of said arms opposite its engaging-face, a spring arranged in said recess, a plate arranged at the outer end of said spring, a bolt extended through said plate, spring and arm, and pivotally connected with the other arm, substantially as described.

4. A shock-absorber consisting of a pair of diverging arms adapted for connection respectively with the frame and axle of an automobile and having curved engaging-faces for engagement with each other to permit of a rocking movement of the arms, means to hold said arms against longitudinal and transverse relative movements and permit a rocking movement, and springs supported by the arms respectively above and below their engaging-faces, both springs being arranged for compression upon rocking movements of the arms in both directions, substantially as described.

5. A shock-absorber consisting of a pair of diverging arms adapted for connection respectively with the frame and axle of an automobile and having curved engaging-faces for engagement with each other to permit a rocking movement of the arms, springs supported by said arms respectively above and below their engaging-faces, and means engaging said springs which also connect said arms together and holds them against longitudinal and transverse movement with respect to each other but permits a rocking movement, substantially as described.

6. A shock-absorber consisting of a pair of diverging arms adapted for connection respectively with the frame and axle of an automobile and having curved engaging-faces for engagement with each other to permit a rocking movement of the arms, springs supported by said arms respectively above and below their engaging-faces, and means engaging said springs which connect said arms together at their engaging faces and which holds said arms against longitudinal and transverse movement with respect to each other, substantially as described.

7. A shock-absorber consisting of a pair of diverging arms adapted for connection respectively with the frame and axle of an automobile and having curved engaging-faces for engagement with each other, permitting a rocking movement of the arm, springs supported by said arms opposite their engaging-faces, bolts extended through said springs and arms and having heads arranged at said engaging-faces formed with ears for pivotal connection with each other and a pivot-pin extended transversely through holes in said ears, substantially as described.

8. A shock-absorber consisting of a pair of diverging arms adapted for connection respectively with the frame and axle of an automobile and having curved engaging-faces for engagement with each other, permitting a rocking movement of the arms, recesses formed in the inner ends of said arms opposite their engaging-faces, springs arranged in said recesses, plates arranged at the outer ends of said springs, bolts extended through said plates and springs and arms, said bolts having nuts engaging the plates and having ears projecting from the engaging-faces of the arms and a pivot-pin extended through holes in said ears, substantially as described.

9. A shock-absorber consisting of a pair of diverging arms adapted for connection respectively with the frame and axle of an automobile and having curved engaging-faces and springs arranged opposite said engaging-faces, and means extended through both springs and arms, at their engaging faces, for connecting the arms together, whereby both springs are compressed upon movements of the arms both toward and from each other, substantially as described.

10. A shock-absorber consisting of a member having a recess, a spring contained in said recess adapted to engage the side wall of the recess when compressed, another member, and means connecting said members together which engages the end of said spring, said members being arranged for engagement respectively with the frame and axle of an automobile, substantially as described.

In testimony whereof, I have signed my name to this specification, in the presence of two subscribing witnesses.

HENRY A. TUTTLE.

Witnesses:
B. J. NOYES,
H. B. DAVIS.